United States Patent [19]

Ninomiya et al.

[11] Patent Number: 5,654,046

[45] Date of Patent: Aug. 5, 1997

[54] OPTICAL ELEMENT

[75] Inventors: Masanobu Ninomiya; Ryojiro Akashi; Takashi Morikawa; Takashi Uematsu, all of Minami-ashigara, Japan

[73] Assignee: Fuji Xerox Co., Ltd., Tokyo, Japan

[21] Appl. No.: 543,473

[22] Filed: Oct. 16, 1995

[30] Foreign Application Priority Data

Dec. 2, 1994 [JP] Japan .................................. 6-324027

[51] Int. Cl.$^6$ ...................................... C09K 19/00
[52] U.S. Cl. ...................... 428/1; 428/64.1; 428/64.2; 428/64.4; 428/65.1; 428/913; 430/270.14; 430/495.1; 430/945; 369/283; 369/288
[58] Field of Search .............. 428/1, 64.1, 64.2, 428/64.4, 65.1, 913; 430/270.1, 270.11, 270.14, 495.1, 945; 369/283, 288

[56] References Cited

U.S. PATENT DOCUMENTS

| | | | |
|---|---|---|---|
| 5,292,568 | 3/1994 | Tezuka et al. | 428/64 |
| 5,312,663 | 5/1994 | Kosinski et al. | 428/64 |
| 5,342,669 | 8/1994 | Yoshikawa et al. | 428/64 |
| 5,415,914 | 5/1995 | Arioka et al. | 428/64 |

FOREIGN PATENT DOCUMENTS

| | | |
|---|---|---|
| 54-119377 | 9/1979 | Japan . |
| 60-180887 | 9/1985 | Japan . |
| 61-237684 | 10/1986 | Japan . |
| 1-133781 | 5/1989 | Japan . |
| 2-566 | 1/1990 | Japan . |
| 4-80080 | 3/1992 | Japan . |
| 4-218024 | 8/1992 | Japan . |
| 5-38881 | 2/1993 | Japan . |
| 6-18866 | 1/1994 | Japan . |

OTHER PUBLICATIONS

Eur. Polym. J., vol. 18, pp. 651 to 659 (1982), "Thermotropic Liquid-Crystalline Polymers-VI*", Valery P. Shibaev et al.

Mol. Cryst. Liq. Cryst., vol. 169, pp. 167-192 (1989), "Application of Side Chain Type Liquid Crystal Polymer for Display and Recording Devices", T. Nakamura et al.

Makromol. Chem. vol. 179, pp. 273-276 (1978), "Model Considerations and Examples of Enantiotropic Liquid Crystalline Polymers", Heino Finkelmann et al.

Primary Examiner—Patrick Ryan
Assistant Examiner—Elizabeth Evans
Attorney, Agent, or Firm—Oliff & Berridge

[57] ABSTRACT

An optical element which exhibits a great improvement in durability even after repeated use. The optical element comprising a substrate having thereon (a) a recording layer comprising a liquid crystal polymer composition and (b) a surface protective layer in this order, in which the protective layer comprises a plurality of layers laminated such that the hardness thereof increases from the layer adjacent to the recording layer toward the uppermost layer in order, or the protective layer comprises a plurality of layers laminated such that the glass transition point thereof becomes higher from the layer adjacent to the recording layer toward the uppermost layer in order. Furthermore, the layer adjacent to the recording layer preferably has a pencil hardness of HB or higher and the uppermost layer preferably has a pencil hardness of 3 H or higher.

18 Claims, 1 Drawing Sheet

OPTICAL ELEMENT

FIELD OF THE INVENTION

The present invention relates to an optical element having a recording layer and a surface protective layer laminated thereon. The recording layer comprises a liquid crystal polymer composition which reversibly operates to record and erase data when externally acted upon to control its light scattering.

BACKGROUND OF THE INVENTION

In recent years, rewritable recording medium which can reversibly operate to record and erase image data have been noted. Rewritable thermosensitive recording materials having a rewritable recording medium which is adapted to perform recording and erasure using a heating unit such as thermal head have been developed. As these thermosensitive recording materials there have been proposed a thermosensitive recording material having a recording layer comprising a liquid crystal polymer (JP-A-4-218024 (The term "JP-A" as used herein means an "unexamined published Japanese patent application")), a thermosensitive recording material having a recording layer composed of a composite film having an organic low molecular weight compound dispersed in a resin matrix (JP-A-54-119377), a thermosensitive recording material having a recording layer comprising a leuco dye layer (JP-A-61-237684), a thermosensitive recording material having a recording layer composed of a polymer film made of a blend of two kinds of polymers (JP-A-60-180887), etc.

As a thermosensitive recording material having a surface protective layer provided on a rewritable recording medium having a thermosensitive recording layer comprising a liquid crystal polymer there has been known a thermosensitive recording material comprising a single surface protective layer mainly composed of an ultraviolet radiation curing resin (JP-A-4-218024). As a surface protective layer for rewritable recording medium comprising a thermosensitive recording layer composed of a composite film having an organic low molecular weight compound dispersed in a resin matrix, there have been known a surface protective layer consisting of two layers, i.e., a interlayer mainly composed of polyamide and a surface coat layer composed of heat-resistant resin (JP-A-1-133781) and a surface protective layer consisting of two layers, i.e., a interlayer composed of heat-resistant resin and a layer composed of a cured product with crosslinking of silicone-modified polyurethane and polyisocyanate (JP-A-5-38881). As such surface protective layers there have been known a material mainly composed of an ultraviolet radiation curing resin or electron radiation curing resin (JP-A-2-566) and a material having a filler dispersed therein (JP-A-4-80080).

The surface protective layer for an optical element comprising a thermosensitive recording layer composed of a liquid crystal polymer is required to have various specific properties. For example, the surface protective layer is required to exhibit abrasion resistance high enough to prevent the optical element from being scratched as an ordinary surface coat. Furthermore, the surface protective layer must resist heat and pressure given by a thermal head, heat roller or the like. Moreover, the surface protective layer must have a good adhesion to the recording layer. Since a thermal head, heat roller or the like is used to perform recording/erasure, the surface protective layer is required to exhibit surface friction and surface smoothness high enough to facilitate the paper feed.

However, the prior art surface protective layer consisting of a single layer can hardly satisfy the foregoing requirements. Further, if a two-layer surface protective layer for a rewritable recording medium comprising a thermosensitive recording layer composed of a composite film having an organic low molecular weight compound dispersed in a resin matrix is applied to a rewritable recording medium having a thermosensitive recording layer comprising a liquid crystal polymer, a problem arises that recording/erasure using a heating unit such as thermal head causes cracking in the surface protective layer by the simultaneous application of heat and stress because of the following reasons.

That is, when recording/erasure of data is performed on an optical element having a thermosensitive recording layer comprising a liquid crystal polymer, the optical element must be heated to a temperature of not lower than the liquid crystal phase-isotropic phase transition temperature (Ti) of the liquid crystal polymer. In this case, when the temperature reaches Ti or higher, the effect of phase transition causes the liquid crystal polymer to show a sudden drop in viscosity, to thereby soften the liquid crystal polymer layer. Since the surface protective layer forms a hard layer to have an improved surface friction, the optical element has a hard surface protective layer formed directly on the very soft liquid crystal polymer layer. Thus, the optical element becomes structurally very weak. When the optical element is stressed by a heating unit such as thermal head under these conditions, cracks are developed in the surface protective layer. On the contrary, if the rewritable recording medium comprising as a thermosensitive recording layer a composite film having an organic low molecular weight compound dispersed in a resin matrix is heated to perform recording/erasure of data, no cracking occurs even when the surface protective layer consists of two layers because it shows no viscosity drop unlike the liquid crystal polymer.

As mentioned above, the optical element having a thermosensitive recording layer comprising a liquid crystal polymer is disadvantageous in that cracking occurs even if a surface protective layer consisting of two layers is formed unlike the rewritable recording medium comprising a thermosensitive recording layer composed of a composite film having an organic low molecular weight compound dispersed in a resin matrix.

SUMMARY OF THE INVENTION

It is therefore an object of the present invention to provide an optical element which exhibits a great improvement in durability even after repeated use, which has a surface protective layer provided on a recording layer comprising a liquid crystal polymer composition.

Other objects and effects of the present invention will be apparent from the following description.

The above objects of the present invention is achieved by providing:

an optical element comprising a substrate having thereon (a) a recording layer comprising a liquid crystal polymer composition and (b) a surface protective layer in this order, wherein said protective layer comprises a plurality of layers laminated such that the hardness thereof increases from the layer adjacent to said recording layer toward the uppermost layer in order;

an optical element comprising a substrate having thereon (a) a recording layer comprising a liquid crystal polymer composition and (b) a surface protective layer in this order, wherein said protective layer comprises a plurality of layers laminated such that the glass transition point thereof becomes higher from the layer adjacent to said recording layer toward the uppermost layer in order; and an optical element according to the above described embodiments, wherein said layer adjacent to said recording layer has a pencil hardness of HB or higher and said uppermost layer of said protective layer has a pencil hardness of 3 H or higher.

DETAILED DESCRIPTION OF THE INVENTION

Figure 1:
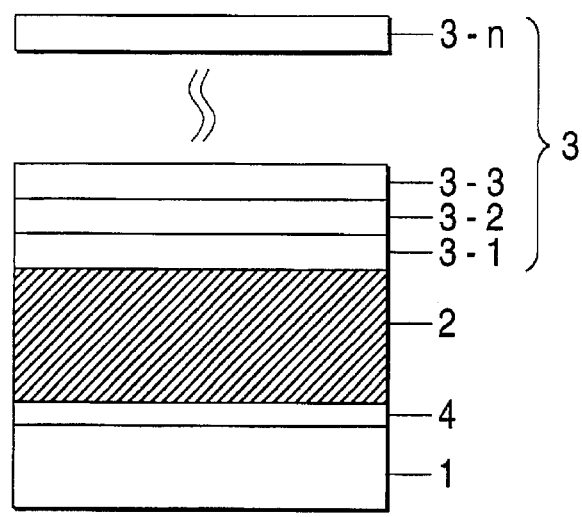
FIG. 1 is a typical sectional view of one embodiment of the optical element according to the present invention.
Figure 2:
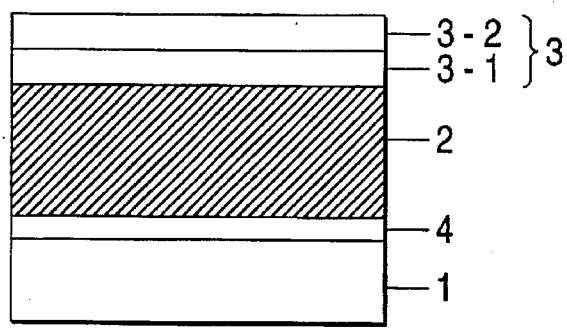
FIG. 2 is a sectional view of another embodiment of the optical element according to the present invention.
Figure 3:
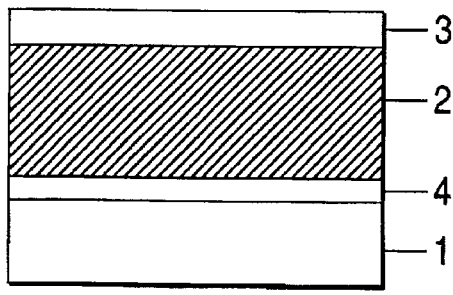
FIG. 3 is a sectional view of a conventional embodiment of an optical element.

The detailed description of the present invention will be described referring to the accompanied drawings. In FIGS. 1 to 3, reference numeral 1 indicates a supporting substrate; 2, a recording layer (liquid crystal polymer composition layer); 3, a surface protective layer; 4, a light reflecting layer; 3-1, 1st surface protective layer; 3-2, 2nd surface protective layer; 3-3, 3rd surface protective layer; . . . ; 3-n, n-th surface protective layer.

FIG. 1 illustrates one embodiment of the optical element of the present invention, and is a typical sectional view demonstrating that the surface protective layer 3 comprises a plurality of layers. The surface protective layer 3 comprises a plurality of layers (1st surface protective layer 3-1, 2nd surface protective layer 3-2, . . . n-th surface protective layer 3-n) laminated such that the hardness thereof increases from the layer adjacent to the recording layer 2 (1st surface layer 3-1) toward the uppermost layer (3-n). FIG. 2 is a sectional view illustrating another embodiment of the optical element of the present invention. The surface protective layer 2 composed of two layers. The hardness of the 2nd surface protective layer 3-2 is higher than that of the 1st surface protective layer 3-1. FIG. 3 is a sectional view of a conventional optical element having a single surface protective layer.

The surface protective layer 3 of the present invention is described below.

The surface protective layer 3 of the present invention comprises a laminate of a plurality of layers. The surface protective layer 3 preferably comprises a material excellent in various properties such as abrasion resistance, heat resistance, pressure resistance, surface-friction resistance and surface smoothness. Examples of a material satisfying these conditions include a thermosetting resin such as ultraviolet radiation curing resin and electron radiation curing resin excellent in pressure resistance, abrasion resistance and heat resistance. The ultraviolet radiation curing resin and electron radiation curing resin can undergo polymerization reaction of multifunctional monomers and multifunctional oligomers to form a film which can serves as a rigid surface protective layer having a high mechanical strength.

Specific examples of the material constituting the surface protective layer 3 of the present invention include multifunctional oligomers having from 1 to 10 functional groups such as polyester acrylate, polyester methacrylate, polyether acrylate, polystyryl methacrylate, polyether methacrylate, urethane acrylate, epoxy acrylate (particularly epoxy acrylate having bisphenol A type, bisphenol F type or bisphenol S type skeleton, phenol novolak type epoxy acrylate), polycarbonate, polybutadiene acrylate, silicone acrylate and melamine acrylate. Preferred examples of such a material include monofunctional or multifunctional monomers such as 2-ethylhexyl acrylate, cyclohexyl acrylate, phenoxyethyl acrylate, 1,6-hexanediol acrylate and tetraethylene glycol diacrylate. These materials may be used in various combinations to form the surface protective layer 3 comprising a laminate of a plurality of layers, and each of the layers constituting the protective layer 3 may comprise one or more kinds of these materials in combination.

The uppermost layer 3-n of the surface protective layer 3 is required to have sufficient pressure resistance, abrasion resistance and heat resistance. Preferred examples of a material satisfying these conditions include a resin such as dipentaerythritol hexaacrylate, tripropylene glycol diacrylate and modification product thereof, because these resins exhibits particularly excellent in hardness and heat resistance. A finely divided particles such as filler may be dispersed in the resin, as needed, to alter the shape of the surface of the uppermost layer, thereby properly controlling the friction coefficient with a thermal head, etc.

The layer constituting the surface protective layer 3 that is formed on the recording layer 2 comprising a liquid crystal polymer composition (1st surface protective layer 3-1) is required to have a sufficient tackiness particularly to the recording layer 2. Examples of a material satisfying the condition include a resin having a good adhesion with polymer compounds such as hexanediol diacrylate, neopentylglycol diacrylate and hydroxypivalic neopentylglycol diacrylate.

The thickness of the surface protective layer 3 of the present invention depends on the kind of the material used and the number of layers constituting the surface protective layer 3. The various layers constituting the surface protective layer 3 each have a thickness of generally from 0.5 μm to 4 μm, preferably from 1 μm to 2 μm. The laminate of these layers has a thickness of generally from 1 μm to 10 μm, preferably from 2 μm to 4 μm.

The process for forming the surface protective layer 3 of the present invention is described with reference to ultraviolet radiation curing method. The foregoing oligomer or monomer is mixed with a photopolymerization initiator in a proportion of from 2 to 5% by weight. The mixture is dissolved in a solvent to control the viscosity thereof. The solution thus obtained is then applied to the surface of the recording layer 2 comprising a liquid crystal polymer composition. The coated material is then heated as needed. The coated material is then irradiated with ultraviolet rays so that it is cured to form the 1st surface protective layer 3-1. This procedures can be then repeated in sequence to form the surface protective layer 3 comprising a plurality of layers. The foregoing oligomers and monomers can be used also in the case of electron radiation curing method. Thus, the film formation can be similarly accomplished. However, the electron radiation curing method differs from the ultraviolet radiation curing method in that it requires no polymerization initiator and that the coated material is irradiated with electron rays instead of ultraviolet rays.

Examples of resins for use in forming the surface protective layer 3 other than ultraviolet radiation curing or electron radiation curing resins include saturated polyester resins, unsaturated polyester resins, epoxy resins, phenol resins, polycarbonates, polyamides, polyethylene, polystyrene, polyvinyl alcohol, polyvinyl butyral, and polyurethane. The surface protective layer 3 may be formed by a process which comprises mixing the foregoing resin with a heat polymerization initiator in a proportion of from 2 to 5% by weight, adjusting the viscosity of the mixture with a solvent, applying the solution thus obtained to the recording layer 2, and then heating the coated material.

The lamination structure of the surface protective layer 3 of the present invention is further described below.

The surface protective layer 3 of the present invention comprises a plurality of layers laminated such that the hardness thereof increases from the layer adjacent to the recording layer 2 (1st surface protective layer 3-1) toward the uppermost layer in order.

The durability of the optical element greatly depends on the combination the combination of layers constituting the surface protective layer 3 because the layers consisting the surface protective layer 3 each have a thickness as small as from 0.5 to 4 μm and the hardness of one layer is affected by that of a layer on which the layer is formed. In other words, there causes a difference in hardness of the layer constituting the surface protective layer 3 between when it is formed on a soft resin and when it is formed on a hard resin, even if the surface protective layer 3 composed of a plurality of layers made of the same kind of a material.

Therefore, in order to raise the hardness of the uppermost layer of the protective layer 3 (n-th surface protective layer 3-n), it is necessary that the hardness of the layer directly under the uppermost layer, be also raised. Since the recording layer 2 comprising a relatively soft liquid crystal polymer composition has been formed directly under the laminate of layers constituting the surface protective layer 3, it is effective to gradually raise the hardness of the laminating layers from the layer adjacent to the recording layer 2 toward the uppermost layer in order so that the hardness of the uppermost layer of the surface protective layer 3 can be raised. Further, the gradual enhancement of hardness is also advantageous in that stress in the film-thickness direction can be moderately relaxed. In this arrangement, the pencil hardness of the uppermost layer constituting the surface protective layer 3 is preferably 3 H or higher, particularly preferably 5 H or higher. The pencil hardness of the layer constituting the surface protective layer 3 that is formed directly on the soft liquid crystal polymer composition layer is preferably from HB to 4 H. If the pencil hardness of the layer formed directly on the liquid crystal polymer composition layer is lower than HB, the hardness is almost the same as that of the liquid crystal polymer composition. This may reduce the stress-relaxing effect.

The toughness of the layers constituting the surface protective layer 3 made of coating resin can also be defined by the value of glass transition temperature (Tg). It is known that the higher Tg of a polymer compound is, the higher the heat resistance of the polymer compound is. When the optical element is heated by a heating unit such as thermal head, it gives a temperature gradient such that the uppermost layer of the surface protective layer 3 exhibits the highest temperature and the temperature gradually lowers toward the recording layer 2. Then, it is necessary that the heat resistance of the surface protective layer 3 be higher toward the uppermost layer. Therefore, in the laminate structure of the surface protective layer 3 of the present invention, it is preferred that Tg of the resin used for the plurality of layers increases from the layer adjacent to the recording layer 2 toward the uppermost layer. In particular, Tg of the resin for use in the uppermost protective layer is preferably not lower than 150° C., particularly preferably not lower than 200° C. Furthermore, the Tg of the resin for use in the layer adjacent to the recording layer 2 is preferably from 20° to 150° C., particularly preferably from 90° to 150° C.

The liquid crystal polymer constituting the liquid crystal polymer composition for use in the present invention is described below.

Main chain type liquid crystal polymers having a mesogen group (molecule exhibiting liquid crystal properties) in its main chain and side chain type liquid crystal polymers having a mesogen group connected to its side chain are known as such liquid crystal polymers. In the present invention, the side chain type liquid crystal polymer is preferred. Preferred examples of the side chain type liquid crystal polymer for use in the present invention includes those comprising a repeating unit represented by structural formula 1, 2 or 3:

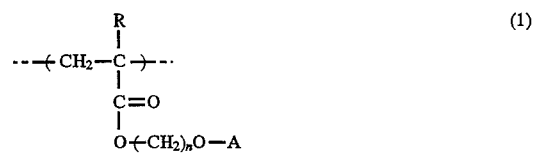

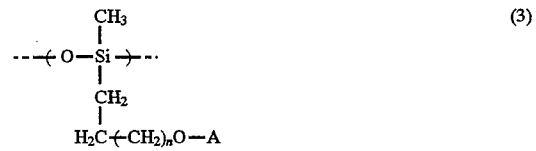

wherein R represents a hydrogen atom or methyl group; n represents an integer of from 1 to 30, preferably an integer of from 2 to 20; and A represents a mesogen group selected from the group consisting of the following compounds (a) to (k):

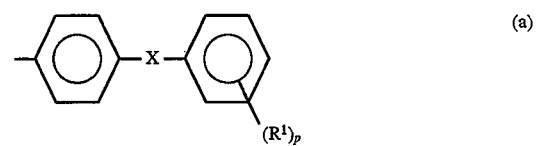

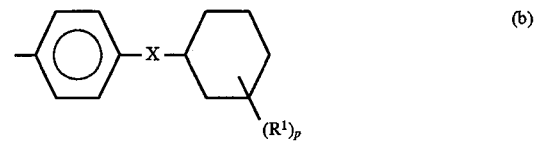

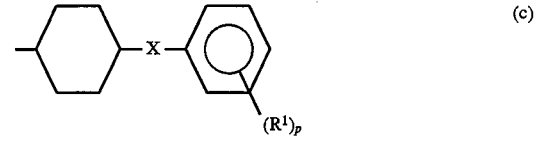

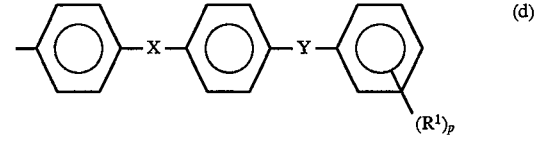

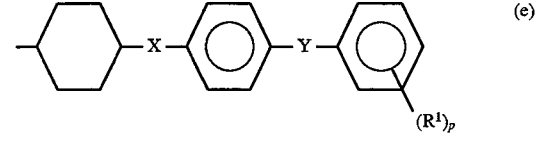

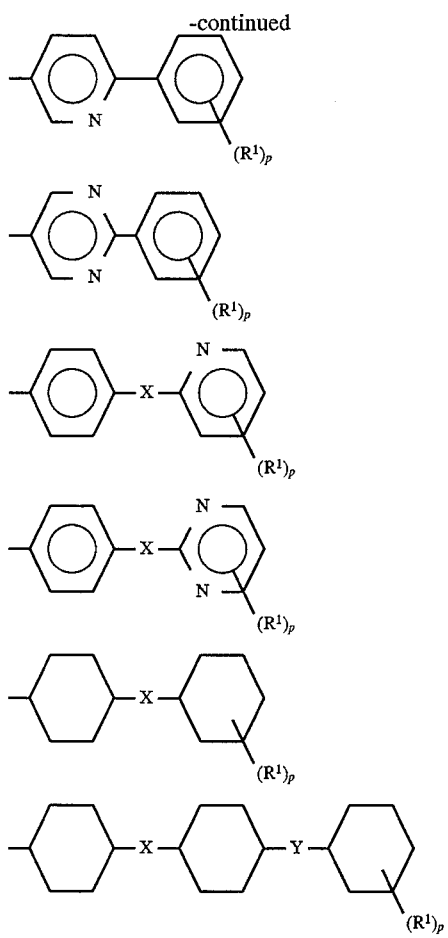

wherein X and Y each represent a single bond, —N=N—, —N(→O)=N—, —CH=N—, —N=CH—, —COO—, —C(C=O)— or an ethynylene group; $R^1$ represents an alkoxy group preferably having 1 to 10 carbon atoms, a halogen atom, a cyano group, a carboxyl group or an alkyl group preferably having 1 to 10 carbon atoms; and p represents an integer of from 1 to 5, provided that when p is 2 or more, the plurality of $R^1$ may be different.

In the present invention, a phase separation type liquid crystal polymer having a non-mesogenic component copolymerized in its side chain, which is obtained by the copolymerization of a mesogenic monomer with a non-mesogenic monomer is preferably used. Such a liquid crystal polymer is disclosed in JP-A-4-218024 and JP-A-6-18866. The use of such a liquid crystal polymer makes it possible to drastically enhance the contrast of the recorded image and optimize the heat sensitivity of the optical element.

Furthermore, a crosslinked liquid crystal polymer is preferably used in the present invention. In particular, a crosslinked liquid crystal polymer having a multi-domain structure is preferred. High-speed and stable recording and erasure can be achieved by employing a liquid crystal polymer crosslinked so as to have a multi-domain structure made of an aggregate of optically anisotropic domains having a specific size. The term "multi-domain structure" as used herein means a structure made of an aggregate of a plurality of microdomains having optical anisotropy (birefringence). This structure exhibits a strong light scattering property. In particular, the multi-domain structure having a domain size in the range of from 0.2 to 1.5 µm in diameter at the maximum of the distributed number of domains are preferred because it can scatter light most strongly.

The crosslinking of the liquid crystal polymer can be accomplished by the application of an external stimulation such as heat, light and electron radiation to the recording layer comprising the liquid crystal polymer. Examples of the liquid crystal polymer to be crosslinked for use in the present invention include compounds containing a reactive group as one component of main chain or side chain. Such a compound can be crosslinked by utilizing the reactive group, optionally in the presence of a catalyst and a multi-functional reactive compound. Specific preferred examples of the reactive group include a vinyl group, an acrylate group, a methacrylate group, heterocyclic groups such as an epoxy group, groups which can undergo addition reaction or polymerization such as an isocyanate group, etc., a hydroxyl group, an amino group, acid amides, thiol groups, a carboxyl group, sulfonic acid groups, phosphoric acid groups, metallic alcoholate groups, and magnesium halide groups (Grignard reagent). Examples of the catalyst include various ultraviolet polymerization initiators and heat polymerization initiators. Examples of the multi-functional reactive compound include multi-functional isocyanate compounds, multi-functional epoxy compounds, multi-functional melamine compounds, multi-functional aldehyde compounds, multi-functional amine compounds, and multi-functional carboxyl compounds.

The process for the preparation of the liquid crystal polymer is described below. The preparation of the foregoing side chain type liquid crystal polymer can be normally accomplished by the polymerization of a polymerizable mesogenic monomer or by the addition of a mesogenic compound which can undergo addition reaction to a reactive polymer such as hydrogenated polysilicone. These techniques are disclosed in Makromol. Chem., page 273, 179 (1978), Eur. Pollan. J., 18, page 651 (1982), and Mol. Cryst. Liq. Cryst., 169, page 167 (1989).

The liquid crystal polymer for use in the present invention can be prepared in the same manner as described above. Representative examples of the foregoing polymerizable mesogenic monomer and mesogenic compound which can undergo addition reaction include various compounds comprising a rigid molecule (mesogen), such as biphenyl compounds, phenyl benzoate compounds, cyclohexyl benzene compounds, azoxy benzene compounds, azo benzene compounds, azomethine compounds, phenyl pyrimidine compounds, diphenyl acetylene compounds, biphenyl benzoate compounds, cyclohexyl biphenyl compounds and terphenyl compounds, having an acrylate, a methacrylate or a vinyl group connected thereto preferably via an alkyl spacer having a predetermined length.

Specific examples of the structure of these compounds are given below.

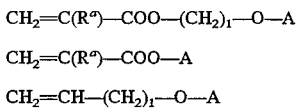

wherein $R^a$ represents a hydrogen atom or methyl group; 1 represents an integer of from 1 to 30; and A is the same as defined in the structural formula 1.

The non-mesogenic monomer or non-mesogenic compound to be copolymerized or co-added together with the foregoing mesogenic monomer in the preparation of the liquid crystal polymer of the present invention is preferably suitable for improving the contrast of a recorded image and for optimizing thermal properties of the optical element. Examples of such a compound include alkyl (meth)acrylate and derivatives thereof, styrene and derivatives thereof, vinyl acetate, (meth)acrylonitrile, vinyl chloride, vinylidene chloride, vinyl pyrrolidone, 1-hexene, 1-octene, and compound having a reactive group for the post-crosslinking such as (meth)acrylic acid, ω-carboxy-polycaprolactone-mono (meth)acrylate, vinyl sulfonate, hydroxyethyl (meth) acrylate, hydroxypropyl (meth)acrylate, 2-(meth) acryloxyethyl acid phosphate, 2-hydroxy-3-phenoxypropyl (meth)acrylate, 2-(meth)acryloxyethyl succinate, phthalic mono(meth)acrylate, 2-(meth)acryloxyethyl (2-hydroxyethyl)phthalate, 4-(meth)acryloxyalkyloxybenzoic acid, glyceryl (meth)acrylate, hydroxy-substituted styrene, (meth)acrylamide, N,N-dimethylaminoethyl (meth) acrylate, N,N-diethylaminoethyl (meth)acrylate, glycidyl (meth)acrylate, 2-propene-1-ol and 5-hexene-1-ol, however, are not limited to these compounds. In order to allow the foregoing compound to be copolymerized with a mesogenic monomer or co-added to a liquid crystal polymer, the compound is preferably used in an amount of from 0.1 to 70 mol % as calculated in terms of monomer unit.

The liquid crystal polymer of the present invention can be prepared by allowing the foregoing monomer and reactive compound to undergo homopolymerization or copolymerization reaction such as radical polymerization and ion polymerization or addition reaction with a reactive polymer. The weight average molecular weight of the liquid crystal polymer composition for use in the present invention is preferably from 1,000 to 1,000,000, particularly preferably from 10,000 to 500,000. The mechanism of the copolymerization reaction may be in various forms such as random copolymerization, block copolymerization, graft copolymerization and alternating copolymerization.

Various components may be added to liquid crystal polymer constituting the recording layer 2 of the present invention for improving various properties thereof. For example, various oxidation inhibitors such as hindered amine and hindered phenol maybe added for improving weather resistance, and various dichroic dyes such as anthraquinone dyes, styryl dyes, azomethine dyes and azo dyes may be added for improving the contrast of a recorded image. Moreover, various fluorescent dyes may be added for improving light scattering properties. In the case where laser is used for recording, various laser-absorbing dyes (near infrared-absorbing dyes such as phthalocyanine, squarylium and azulenium may be used in the case where ordinary semiconductor laser having a wavelength of from 780 nm to 830 nm is used) are preferably added to the liquid crystal polymer.

The liquid crystal polymer composition preferably contain the foregoing various components each in an amount of from 0.01 to 5% by weight based on the weight of the composition, respectively. Further, the liquid crystal polymer composition may contain a low molecular liquid crystal compound in an amount of from 1 to 20% by weight based on the weight of the composition.

The substrate 1 for use in the present invention include films made of a polymer compound such as polyvinyl chloride, polypropylene, polyester (e.g., PET) and polyimide, paper substrates, metal substrates, ceramic substrates, glass substrates or the like. Further, the substrate 1 of the present invention may have a light-absorbing layer, colored layer or light-reflecting layer 4 provided thereon. Examples of such a substrate include colored film obtained by dispersing a dye in PET film, PET film having a colored layer provided thereon, and deposited metal film obtained by deposition of a substrate with a metal having a high reflectance. Moreover, a substrate having an electrode may be preferably used. The thickness of the light-absorbing layer or light-reflecting layer 4 is suitably selected from the range of from 0.001 to 100 μm. The thickness of the colored layer is generally in the range of from 0.5 to 5 μm.

The recording layer 2 comprising a liquid crystal polymer can be formed by an ordinary method such as coating methods with a solvent and heat fusion coating method. Although the optimum thickness of the liquid crystal polymer composition layer depends on the desired contrast and thus not specifically limited, it is selected from the range preferably from 1 μm to 100 μm, particularly preferably from 5 μm to 50 μm.

The present invention will be further described in the following examples, but the present invention should not be construed as being limited thereto.

(Synthesis Example of Liquid Crystal Polymer)

In the presence of azobisisobutyronitrile (AIBN) as a polymerization initiator, 1.9 g of 4-acryloxyhexyloxy-4'-cyano-biphenyl as a mesogenic monomer and 0.1 g of 2-hydroxyethyl acrylate as a reactive monomer were subjected to polymerization in tetrahydrofuran as a solvent. The resulting polymer solution was then subjected to precipitation with ethyl alcohol as a precipitating solvent three times so that it was purified to obtain 1.9 g of a liquid crystal polymer represented by the following structural formula:

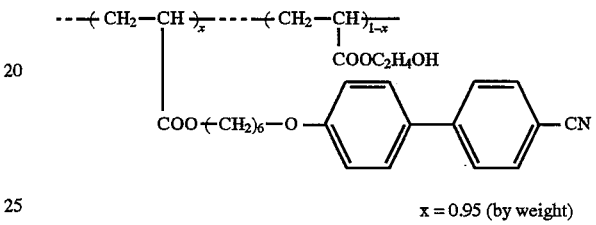

x = 0.95 (by weight)

To 1.0 g of the liquid crystal polymer thus obtained were then added 0.05 g of Colonate HX (multi-functional isocyanate compound available from Nippon Polyurethane Industries Co., Ltd.) as a crosslinking agent and 3.0 g of methyl ethyl ketone (MEK) as a solvent to make a solution. The solution thus obtained was applied to a PET substrate by means of a blade coater and then dried to form a liquid crystal polymer layer having a thickness of about 6 μm thereon. The liquid crystal polymer layer thus obtained was cloudy and capable of controlling light-scattering. Ti (liquid crystal phase-isotropic phase transition temperature) of the liquid crystal polymer composition before crosslinked was about 90° C. The material was then subjected to heat treatment for adjusting the multi-domain thereof in an oven the temperature of which had been kept to 85° C., where the liquid crystal polymer stays liquid crystal phaser for 1 minute. The material was then allowed to undergo reaction in a 60° C. oven for 24 hours to obtain a crosslinked liquid crystal polymer composition.

EXAMPLE 1

To a recording layer made of the crosslinked liquid crystal polymer composition obtained in Synthesis Example was applied a mixture of an ultraviolet radiation curing composition mainly composed of a bisphenol A type epoxy acryl monomer (R190, available from Nippon Kayaku Co., Ltd.) with 3% by weight of a photopolymerization initiator (irugacure 184, available from Ciba Geigy). The material was then irradiated with light from a metal halide lamp (50 mW/cm², 365 nm) for 10 seconds to form a 1st surface protective layer having a thickness of 1 μm. To the 1st surface protective layer thus formed was then applied a mixture of another ultraviolet radiation curing composition mainly composed of a novolak type epoxy acrylate monomer (R205, available from Nippon Kayaku Co., Ltd.) with 3% by weight of a photopolymerization initiator (irugacure 184, available from Ciba Geigy). The material was then irradiated with light from a metal halide lamp (50 mW/cm², 365 nm) for 20 seconds to form a 2nd surface protective layer having a thickness of 2 μm thereon. To the 2nd surface protective layer thus formed was then applied a mixture of dipentaerythritol hexaacrylate with 3% by weight of a photopolymerization initiator (irugacure 184, available from Ciba Geigy). The material was then irradiated with light from a metal halide lamp (50 mW/cm², 365 nm) for 10 seconds to form a 3rd surface protective layer having a thickness of 1 µm thereon. Thus, an optical element was obtained.

EXAMPLE 2

To a recording layer made of the crosslinked liquid crystal polymer composition obtained in Synthesis Example was applied polyvinyl butyral to form a 1st surface protective layer having a thickness of 0.5 µm on the recording layer. To the 1st surface protective layer thus formed was then applied a thermosetting resin mainly composed of silicone acrylate (X-12-2150, available from Shin-etsu Silicone Co., Ltd.). The material was then subjected to heat treatment at a temperature of 130° C. for 15 minutes to form a 2nd surface protective layer having a thickness of 1 µm on the 1st surface protective layer. Thus, an optical element was obtained.

EXAMPLE 3

An optical element was prepared in the same manner as in Example 1 except that a 0.5-µm thick polyamide resin (CM8000, available from Toray Industries, Inc.) layer was formed as a 1st surface protective layer instead of the 1st surface protective layer of Example 1, followed by forming a 2nd surface protective layer in the same manner as in the formation of the 2nd surface protective layer in Example 1, further followed by forming a 3rd surface protective layer in the same manner as in the formation of the 2nd surface protective layer in Example 2. Thus, an optical element was obtained.

COMPARATIVE EXAMPLE 1

An optical element was prepared in the same manner as in Example 1 except that as a surface protective layer there was prepared a 1-µm thick thermosetting resin (X-12-2150, available from Shin-etsu Silicone Co., Ltd.) layer alone.

COMPARATIVE EXAMPLE 2

To a recording layer made of the crosslinked liquid crystal polymer composition obtained in Synthesis Example was applied a mixture of an ultraviolet radiation curing composition (R131, available from Nippon Kayaku Co., Ltd.) with 3% by weight of a photopolymerization initiator (irugacure 184, available from Ciba Geigy). The material was then irradiated with light from a metal halide lamp (50 mW/cm², 365 nm) for 20 seconds to form a 1st surface protective layer having a thickness of 2 µm on the recording layer. To the 1st surface protective layer thus formed was then applied a mixture of an ultraviolet radiation curing composition (R190, available from Nippon Kayaku Co., Ltd.) with 3% by weight of a photopolymerization initiator (irugacure 184, available from Ciba Geigy). The material was then irradiated with light from a metal halide lamp (50 mW/cm², 365 nm) for 10 seconds to form a 2nd surface protective layer having a thickness of 1 µm on the 1st surface protective layer. Thus, an optical element was obtained.

(Measurement and evaluation)

The optical elements obtained in the foregoing examples and comparative examples were then measured for pencil hardness in accordance with JIS K5400. The pencil hardness tests were carried out with specimens as formed on a glass substrate. Furthermore, the glass transition temperatures of resins used for surface protective layer were measured using a thermal analysis apparatus (DT-40, manufactured by Shimadzu Corporation) with 10 mg of each resins at a heating rate of 10° C./min.

The results of the pencil hardness tests and the measurement of the glass transition temperature of the resins used for surface protective layer are set forth in Table 1.

TABLE 1

|  | Surface protective layer | Example 1 | Example 2 | Example 3 | Comparative Example 1 | Comparative Example 2 |
|---|---|---|---|---|---|---|
| Pencil | (1st) | HB | H | B | 5H | 4H |
| Hardness | (2nd) | 3H | 5H | 3H | — | HB |
|  | (3rd) | 7H | — | 5H | — | — |
| Glass | (1st) | 117° C. | 110° C. | 36° C. | >250° C. | 168° C. |
| Transition | (2nd) | 131° C. | >250° C. | 131° C. | — | 117° C. |
| Pint | (3rd) | >250° C. | — | >250° C. | — | — |

Data were then recorded on these optical elements using a thermal printer (8 dots/mm, 0.3 mJ/dot) so that the light scattering of the recording layer made of a liquid crystal polymer was reduced (transparent state). In order to erase the data recorded on these optical elements, a heat roller which had been heated to a temperature of 130° C. was used to return the state of the recording layer to a state of high light scattering (light scattering state). The recording/erasure operation was repeated 200 times. The number of flaws developed in the surface protective layer and the number of repetitions of operation required until the initial flaw was developed were examined. The results are set forth in Table 2.

TABLE 2

|  | Example 1 | Example 2 | Example 3 | Comparative Example 1 | Comparative Example 2 |
|---|---|---|---|---|---|
| Number of flaws developed after 200 repetitions | 0 | 1 | 6 | 108 | 116 |
| Number of repetitions required until initial flaw | — | 188 | 32 | 1 | 1 |

The results of Example 2 and Comparative Example 1 shown in Table 2 demonstrate that the use of the surface protective layer composed of a lamination of a plurality of layers provides an improvement in repetition durability. The results of Example 2 and Comparative Example 2 demonstrate that when the surface protective layer comprises a plurality of layers laminated such that the pencil hardness thereof increases toward the surface of the optical element, the repetition durability of the optical element is improved. Similarly, it can be seen that when the surface protective layer comprises a plurality of layers laminated such that the glass transition temperature of the resin used for surface protective layer becomes higher toward the surface of the optical element, the repetition durability of the optical element is improved.

The results of Example 1 and Example 3 demonstrate that the pencil hardness of the surface protective layer in contact with the liquid crystal polymer layer is preferably HB or higher. The comparison of Example 1 with Example 2 demonstrates that when all the surface protective layers are made of a curable resin, a higher repetition durability is obtained.

In accordance with the present invention, the surface protective layer comprises a plurality of layers having different physical properties laminated in a specific order. In this arrangement, various properties required for the surface protective layer of an optical element comprising a recording layer made of a liquid crystal polymer composition, such as abrasion resistance, repetition durability, heat resistance, pressure resistance, adhesion, surface friction and surface smoothness, can be provided separately for the plurality of surface protective layers. In particular, if a plurality of surface protective layers are laminated such that the hardness thereof increases from the layer adjacent to the recording layer toward the surface of the optical element, a film having a high heat resistance, pressure resistance and durability can be formed.

Further, the lamination of a plurality of surface protective layers provides a layer playing a role of a buffer layer which can relax the stress given by the thermal head or heat roller and hence can reduce damage on the liquid crystal polymer composition. In this arrangement, one of the plurality of surface protective layers can be a solvent blocking layer which can prevent a solvent from penetrating into the optical element, making it possible to increase the number of kinds of resins employable herein. Thus, a high performance surface protective layer can be formed.

While the invention has been described in detail and with reference to specific embodiments thereof, it will be apparent to one skilled in the art that various changes and modifications can be made therein without departing from the spirit and scope thereof.

What is claimed is:

1. An optical element comprising a substrate having thereon (a) a recording layer comprising a liquid crystal polymer composition and (b) a surface protective layer in this order, wherein said protective layer comprises a plurality of layers laminated such that the hardness thereof increases from the layer adjacent to said recording layer toward the uppermost layer in order.

2. An optical element comprising a substrate having thereon (a) a recording layer comprising a liquid crystal polymer composition and (b) a surface protective layer in this order, wherein said protective layer comprises a plurality of layers laminated such that the glass transition temperature thereof becomes higher from the layer adjacent to said recording layer toward the uppermost layer in order.

3. The optical element according to claim 2, wherein at least one of said plurality of layers constituting said protective layer comprises a thermosetting resin.

4. The optical element according to claim 3, wherein said layer adjacent to said recording layer has a pencil hardness of HB or higher and said uppermost layer of said protective layer has a pencil hardness of 3 H or higher.

5. The optical element according to claim 4, wherein said surface protective layer consists of two layers comprising a thermosetting resin, and the upper layer thereof has a hardness higher than that of the lower layer thereof adjacent to said recording layer.

6. The optical element according to claim 2, wherein said layer adjacent to said recording layer has a pencil hardness of HB or higher and said uppermost layer of said protective layer has a pencil hardness of 3 H or higher.

7. The optical element according to claim 6, wherein said surface protective layer consists of two layers comprising a thermosetting resin, and the upper layer thereof has a hardness higher than that of the lower layer thereof adjacent to said recording layer.

8. The optical element according to claim 2, wherein said surface protective layer consists of two layers comprising a thermosetting resin, and the upper layer thereof has a hardness higher than that of the lower layer thereof adjacent to said recording layer.

9. The optical element according to claim 2, wherein said liquid crystal polymer composition comprises a liquid crystal polymer containing a mesogenic unit and a non-mesogenic unit.

10. The optical element according to claim 2, wherein said liquid crystal polymer composition is crosslinked.

11. The optical element according to claim 1, wherein at least one of said plurality of layers constituting said protective layer comprises a thermosetting resin.

12. The optical element according to claim 11, wherein said layer adjacent to said recording layer has a pencil hardness of HB or higher and said uppermost layer of said protective layer has a pencil hardness of 3 H or higher.

13. The optical element according to claim 12, wherein said surface protective layer consists of two layers comprising a thermosetting resin, and the upper layer thereof has a hardness higher than that of the lower layer thereof adjacent to said recording layer.

14. The optical element according to claim 1, wherein said layer adjacent to said recording layer has a pencil hardness of HB or higher and said uppermost layer of said protective layer has a pencil hardness of 3 H or higher.

15. The optical element according to claim 14, wherein said surface protective layer consists of two layers comprising a thermosetting resin, and the upper layer thereof has a hardness higher than that of the lower layer thereof adjacent to said recording layer.

16. The optical element according to claim 1, wherein said surface protective layer consists of two layers comprising a thermosetting resin, and the upper layer thereof has a hardness higher than that of the lower layer thereof adjacent to said recording layer.

17. The optical element according to claim 1, wherein said liquid crystal polymer composition comprises a liquid crystal polymer containing a mesogenic unit and a non-mesogenic unit.

18. The optical element according to claim 1, wherein said liquid crystal polymer composition is crosslinked.

* * * * *